United States Patent

[11] 3,623,160

[72] Inventors George R. Giles Williamsville; Donald G. Shuda, Clarence Center; Kenneth R. MacDavid, Clarence Center, all of N.Y.

[21] Appl. No. 858,721
[22] Filed Sept. 17, 1969
[45] Patented Nov. 23, 1971
[73] Assignee Sanders Associates, Inc. Nashua, N.H.

[54] DATA MODULATOR EMPLOYING SINUSOIDAL SYNTHESIS
11 Claims, 9 Drawing Figs.

[52] U.S. Cl. 340/347 DA, 325/163
[51] Int. Cl. H03k 13/02
[50] Field of Search 340/347; 325/38 A, 38, 163, 153; 179/15

[56] References Cited

UNITED STATES PATENTS

| | | | |
|---|---|---|---|
| 3,497,625 | 2/1970 | Hileman et al. | 340/347 |
| 3,521,143 | 7/1970 | Anderson et al. | 321/18 |
| 3,324,376 | 6/1967 | Hunt | 318/20.515 X |

FOREIGN PATENTS

| | | | |
|---|---|---|---|
| 1,018,027 | 7/1964 | Great Britain | 321/SW |

*Primary Examiner*—Maynard R. Wilbur
*Assistant Examiner*—Jeremiah Glassman
*Attorney*—Louis Etlinger

ABSTRACT: Multitone data-transmitting apparatus employing sinusoidal synthesis with harmonic cancellation. A multitone data transmitter employs relative phase displacements between plural digital waveforms all of which are representative of a tone to be transmitted and a weighted summing network for summing the plural waveforms so as to cancel undesirable harmonics of the frequency tone to be transmitted. In the illustrated FSK modulator, four square waves having relative phase shifts of $\pi/4$ radians are given suitable summing weights so as to cancel the third and fifth harmonic of any selected one of the FSK tones.

*INVENTORS*
GEORGE R. GILES
DONALD G. SHUDA
KENNETH R. MAC DAVID
BY
Robert R. Hubbard
*ATTORNEY*

INVENTORS
GEORGE R. GILES
DONALD G. SHUDA
KENNETH R. MAC DAVID
BY
Robert R. Hubbard
ATTORNEY INVENTORS
GEORGE R. GILES
DONALD G. SHUDA
KENNETH R. MAC DAVID
BY
Robert R. Hubbard
ATTORNEY INVENTORS
GEORGE R. GILES
DONALD G. SHUDA
KENNETH R. MAC DAVID
BY
Robert R. Hubbard
ATTORNEY

DATA MODULATOR EMPLOYING SINUSOIDAL SYNTHESIS

BACKGROUND OF THE INVENTION

This invention relates to improved signalling apparatus and to sinusoidal synthesis networks therefor. In particular, the invention relates to transmitting apparatus which is capable of transmitting digital data over a communication channel, such as a transmission line, microwave link, radio link, and the like. Although the signalling apparatus of the present invention may be employed with communication channels of any suitable bandwidth, it is especially suited for use with voice grade channels.

Digital data signals in many present-day digital systems employing binary notation consist of information bits arranged in data words or groups in different permutations of a code to represent conventional letters, numbers or other prearranged symbols. The information bits are represented by signals having either one or the other of two amplitude values depending upon the binary value ("1" or "0") of the bits. For the purpose of the present description, it is convenient to think of these information bits in terms of the mark (for example, binary "1") and space (binary "0") designations of telegraphy.

The transmission of such digital data signals over voice grade communication channels is an important aspect of may present-day electronic signal-processing systems. High-speed teleprinters, computers or data processors and many other digital equipments must frequently be interconnected over existing communication facilities. Unfortunately, the characteristics of the usual voice grade channels are not suitable for the direct transmission of such digital data since it is beyond the frequency capability of such voice grade channels to carry frequency components down to and including zero frequency. To meet this problem, the usual practice has been to employ a carrier signal that is modulated in either an AM (amplitude modulation), FM (frequency modulation) or PM (phase modulation) fashion by the digital information to be transmitted.

One of the troublesome problems associated with data-modulating transmitters has been the design of an efficient and accurate sine wave producing apparatus at low cost in order to provide low distortion or high signal-to-noise ratio data transmission. Generally, prior art data modulators required complex analog circuits including sophisticated filtering circuits to remove lower order harmonics of the sine wave to be transmitted. This problem has been especially acute in multitone systems, such as FM or FSK (frequency shift keying) and multitone PM transmission systems. For example, in an FSK system the second harmonic of the lower frequency bit tone or the third harmonic of the end-of-message tone may have nearly the same frequency as the higher frequency bit tone.

BRIEF SUMMARY OF THE INVENTION

An object of the present invention is to provide novel and improved signalling apparatus.

Another object is to provide novel and improved sinusoidal-synthesizing circuitry which suppresses harmonics of the fundamental frequency of the sinusoid.

Still another object is to provide novel and improved data-modulating apparatus which does not require expensive filtering circuits.

Yet another object is to provide improved multitone data-modulating apparatus which permits high information-packing densities at relatively low cost.

In brief, the invention is embodied in apparatus which provides plural digital signal waves having relative phase displacements and which performs a weighted summation of the digital waves to synthesize an amplitude-quantized wave approximating a sinusoid. The relative phase displacements and summation weightings are design selected to eliminate a particular set of harmonics of the fundamental frequency of the synthesized wave. An encoding means responds to digital information to provide the relatively phased digital signal waves. A summing network then sums the digital waves with weighting to produce the synthesized wave. In the illustrated embodiment the encoding and summation means operate on a sample-and-hold basis.

BRIEF DESCRIPTION OF THE DRAWINGS

In the accompanying diagrams, like reference characters denote like structural elements.

DESCRIPTION OF THE PREFERRED EMBODIMENTS

Figure 1:
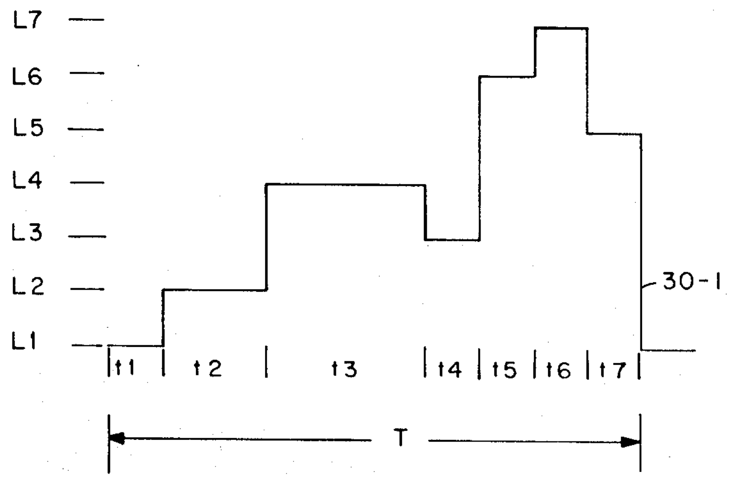
FIG. 1 and 2 are waveform diagrams of typical amplitude-quantized waves.
Figure 2:
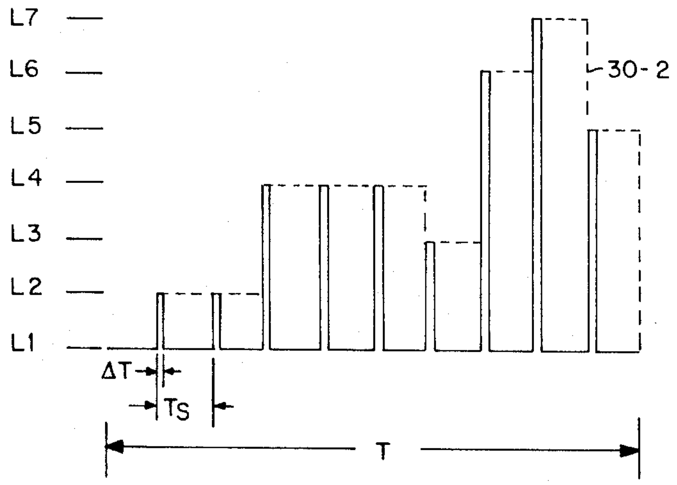

Sinusoidal signal synthesis apparatus embodying the invention produces an approximate sinusoid having a fundamental frequency $f_o$ wherein certain ones of the harmonics of $f_o$ are substantially eliminated in the synthesis. In general, a signal of desired wave shape can by synthesized by forming an amplitude-quantized wave with time-sampling intervals of arbitrary widths and then shaping as by filtering. In FIG. 1, curve 30–1 represents such a quantized wave which could be produced by a sample-and-hold type of system. The curve 30–1 has quantized amplitude steps or levels L1, L2...LN which correspond to an equal number of sampling intervals t1, t2...tN, where each sample is held until the initiation of the next succeeding sample. For convenience in illustration, N is selected to be seven(7). In FIG. 2, the dashed-wave envelope 30–2 is substantially identical to curve 30–1 of FIG. 1 but is produced by discontinuous sample intervals; that is, each sample is held for an interval $\Delta t$ which is shorter than the sampling period $T_s$.

The constants of the harmonic frequency component terms of the Fourier series expansion of either the curve 30–1 or the curve 30–2 are functions of the parameters L1, L2...Ln and t1, t2...tN; and, hence, the harmonic frequency component amplitudes can be controlled by selection of such parameters. In the formation of a sinusoid, the curve 30–1 (or envelope 30–2) is given any suitable shape approximating a sinusoid.

Figure 3:
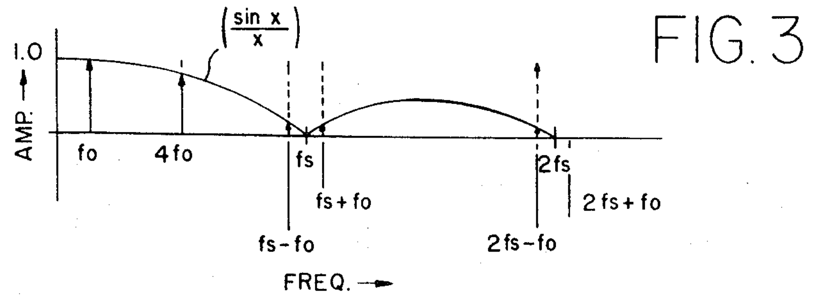
FIGS. 3 and 4 are frequency distribution graphs for sine waves synthesized by sample-and-hold and discontinuous-sampling systems, respectively.
Figure 4:
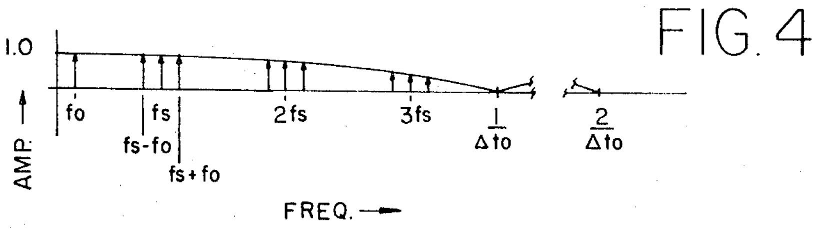

Referring now to the frequency spectral distribution graph of FIG. 3, a result sinusoid formed by a sample-and-hold system at a sample rate $f_s$ generally contains a fundamental component $f_o$, harmonic components of $f_o$ and other components $nf_s \pm f_o$, where $n$ is an integer and where $f_s \geq 2f_o$. All of the component amplitudes are attenuated according to the illustrated $$\left|\frac{\text{Sin } X}{X}\right|$$

curve (shown here as an absolute value with normalized amplitudes for the sake of convenience). The dashed-line extensions of the various components indicate the component amplitudes for perfect impulse sampling of a sine wave, where the sample period of a perfect impulse is infinitely small. FIG. 4 shows the frequency distribution envelope for a sinusoid formed by a discontinuous-type sampling system. In general, these three curves represent plots of three values of $t_o$ in the frequency function G(f) of a rectangular pulse of width $t_o$ and amplitude A, where $$G(f)=\frac{A \sin (\pi t_0 f)}{\pi t_0 f}$$

As pointed out previously, the harmonic component amplitudes can be controlled by selection of the quantization levels L1, L2...LN and the sampling periods t1, t2...tN. This permits the design selection of sample quantization values for a sinusoidal wave, which for many applications will result in hardware simplicity and cost savings. This is especially significant in applications requiring limited bandwidth. For example, in a multitone transmission system, the harmonics of the lower valued tones often have nearly the same frequency as higher valued one of the tones. By employing symmetrical quantized waves, the even harmonics of each tone can be eliminated. In addition, by proper design selection of the quantization levels and sampling periods, undesired ones of the odd harmonics can also be substantially eliminated. This permits the several tones to be generated by time multiplexing a single programmable tone source and mixing at relatively low frequencies before filtering by a single filter. This is in contrast to many multitone systems requiring separate tone generators, different band-pass filters for each tone generator, It is within the contemplation of the present invention that the techniques and apparatus embodying the invention may be utilized in any application requiring wave synthesis. Apparatus embodying the invention provides plural digital waves having relative phase displacements and performs a weighted summation of the phase-displaced waves to synthesize a resultant wave. The relative phase displacements and summation weightings are design selected so as to eliminate a particular set of harmonics from the resultant wave. By way of example and completeness of description, the invention will be illustrated in a sample-and-hold-type multitone modulator embodiment which employs frequency shift keying.

Figure 5:
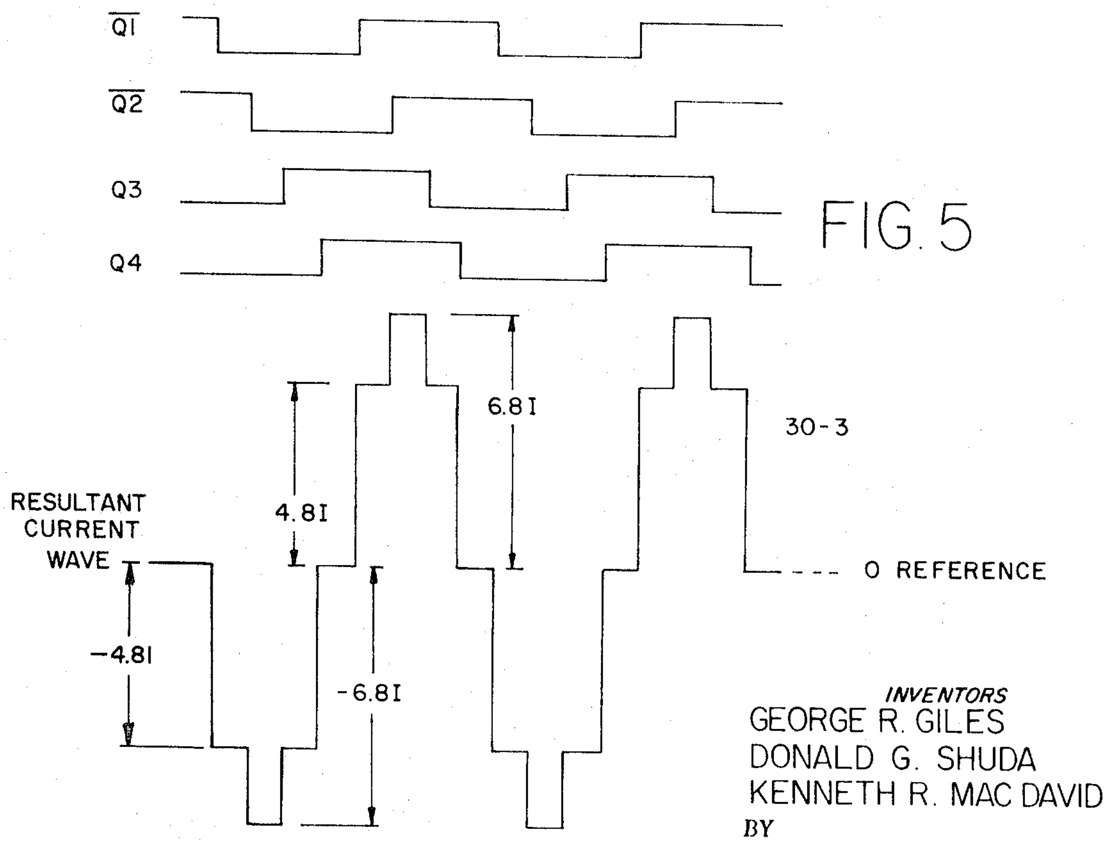
FIG. 5 is another waveform diagram illustrating the phased relationship of a plurality of square waves and resultant quantized wave and approximated sinusoid produced by the sinuoidal synthesis network embodied in the modulator of FIG. 6.

Referring now to FIG. 5, curve 30–3 represents an exemplary wave shape approximating a sinusoid which does not contain any even harmonics and further, does not contain every other pair of odd harmonics beginning with the third and fifth odd harmonics. The even harmonics are eliminated by employing symmetry. The third and fifth odd harmonics are cancelled by algebraically summing properly phased plural digital waves with weighting, where the relative phases and summing weights are functions of the aforementioned amplitude level and time interval parameters. Of course, other wave shapes approximating sinusoids can be employed which eliminate a particular set of undesired harmonics.

For ease of implementation, it is convenient to employ phase angles of $\pi/n$ radians, where $n$ is an integer which is often equal to the number of digital signal waves to be summed. For the illustrated embodiment of the invention, the third and fifth harmonics of the synthesized wave 30–3 are cancelled by employing 45° ($\pi/4$ radians) phase shift (and/or multiples thereof) between each of four square waves and relative weights of 1, 2.414 2.414 and 1. In FIG. 3 waveform diagram, the square waves are designated Q1, Q2, Q3, and Q4. The Q2 and Q4 waves are phase shifted $\pi/4$ radians from the Q1 and Q3 waves and the Q3 wave is phase shifted $(\pi/4)+\pi$ radians from the Q2 wave.

The weighted summation of the differently phased square waves produces the resultant current wave 30–3 approximating a sine wave. The relative current amplitude levels of ±4.81 and ±6.81 are functions of the weightings in the summation. It is understood that the use of four waves with the illustrated relative phase shifts and weightings is by way of example, only, and that other relative phase shifts and weightings can be employed for the same number of waves or for different numbers of waves to produce an approximate sinusoid.

Figure 6:
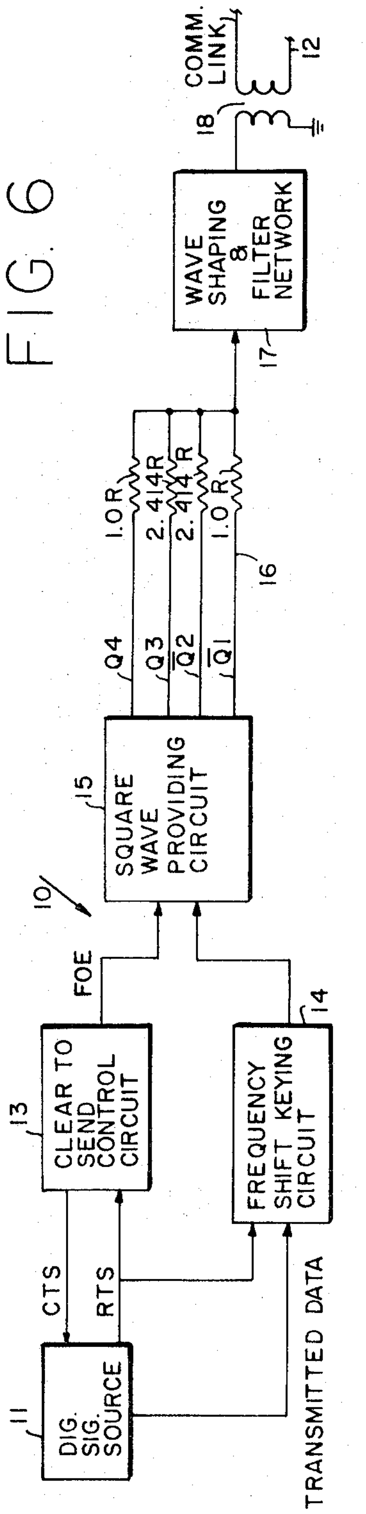
FIG. 6 is a block diagram of an FSK modulator embodying the invention.

Referring now to FIG. 6, an FSK modulator 10 embodying the invention modulates informational mark-and-space (M/S) signals supplied by a digital signal source 11 so as to provide an FSK signal format for transmission over a communication link 12. The communication link 12 may be any suitable communication channel such as a transmission line, microwave link, radio link, and the like. The digital signal source 11 may be any suitable data-processing equipment.

Figure 7:
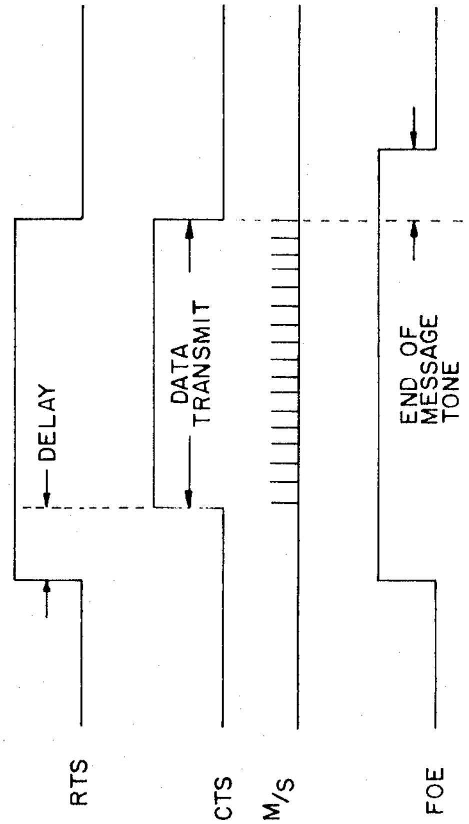
FIG. 7 is a waveform diagram illustrating the data-transmitting conditions of an FSK modulator.

The FSK modulator includes a clear-to-send control circuit 13, a frequency shift keying circuit 14, a digital wave providing circuit 15, a summing network 16, a wave-shaping network 17 and a coupling device, illustrated as a transformer 18. The clear-to-send control circuit 13 includes suitable control circuitry which responds to a request-to-send (RTS) signal provided by signal source 11 to produce a clear-to-send (CTS) signal after a suitable delay and a frequency-output-enable (FOE) signal, all of which signals are illustrated in the common time base waveform diagram of FIG. 7. The signal source 11 responds to the CTS signal to provide M/S data to the frequency shift keying circuit 14. When it is desired to stop transmitting data the signal source 11 terminates the RTS signal. The control circuit 13 responds to the trailing edge of the RTS signal to terminate the CTS signal and after a suitable delay to terminate the FOE signal. During the time interval from the trailing edge of the RTS signal to the trailing edge of the FOE signal, the FSK modulator 10 provides an end-of-message signal or tone.

The frequency shift keying circuit 14 responds to the M/S data and the RTS signal to provide frequency tones indicative of a mark frequency $f_m$, a space frequency $f_s$ and an end-of-message frequency $f_{eom}$ in accordance with the table 1 with a minimal phase discontinuity.

TABLE I

| RTS | M/S | Frequency Tone |
|---|---|---|
| H | L | $8f_m$ |
| H | L | $8f_s$ |
| L | Don't Care | $8f_{eom}$ |

Such frequency shift keying circuits are generally known and a detailed description thereof is not necessary for an understanding of the present invention. Suffice it to say here that the frequency shift keying circuit 14 includes a clock source having a frequency which is a multiple of all three frequency tones $f_m$, $f_s$ and $f_{eom}$, a frequency divider network and associated control circuitry for responding to the high (H) and low (L) conditions of the RTS and M/S signals to cause the divider network to divide the clock frequency in accordance with the conditions set forth in table 1. It is noted that the frequency tones produced by the frequency shift keying circuit 14 are 8 times the $f_m$, $f_s$, and $f_{eom}$ tone. As will become apparent hereinafter, the multiplier 8 is essentially a function of the frequency-dividing capability of the digital wave producing circuit 15 and may have different values (including 1) for different designs of the circuit 15. For convenience, the output signal of frequency shift keying circuit 14 will sometimes be referred to as the 8X tone in the description which follows.

The digital wave producing circuit 15 responds to the 8X tone signal produced by the frequency shift keying circuit 14 to provide plural square waves $\overline{Q1}$, $\overline{Q2}$, Q3, and Q4 (FIG. 3), each having a fundamental frequency of $f_m$, $f_s$ or $f_{eom}$, as the case may be. As shown in FIG. 1, the $\overline{Q1}$, $\overline{Q2}$, Q3 and Q4 waves are coupled to different ones of the summing impedances, for example, resistors, included in summing network 16. The summing resistors have relatively weighted values of 1.0R, 2.414R, 2.414R and 1.0R for the correspondingly applied square waves $\overline{Q1}$, $\overline{Q2}$, Q3, and Q4, respectively.

Figure 8:
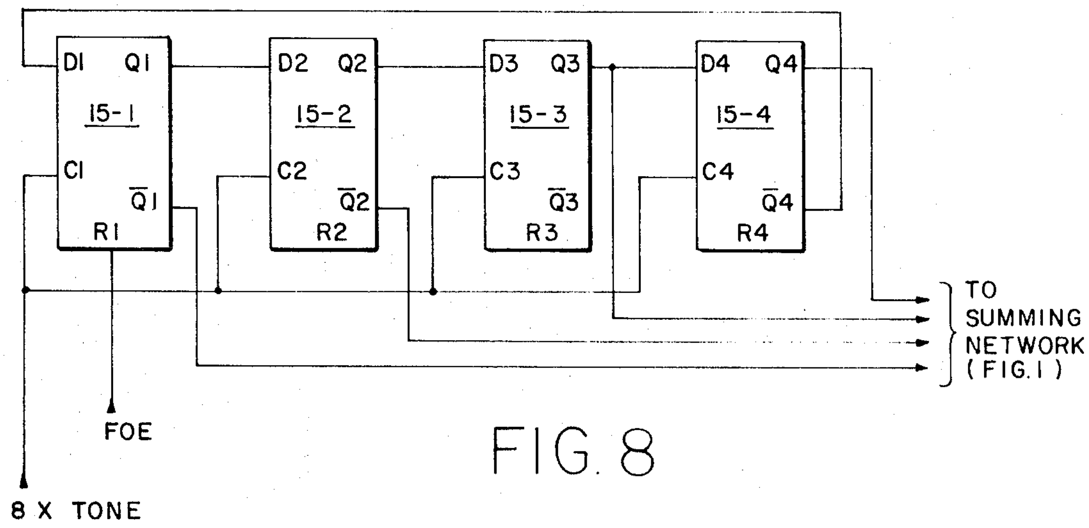
FIG. 8 is a block diagram of the square wave producing circuit of the FSK modulator.

For the illustrated design of the FSK modulator embodying the invention where four square waves are required, the digital wave producing circuit 15 may suitably take the form of a four-stage digital counter such as the one illustrated in FIG. 8. In FIG. 8, each of the counter stages is a D-type flip-flop having D (input), C (clock), R (reset), $\overline{Q}$ (output) and Q (output) terminals. Each of the counter stages is identified by the numeric character 15 followed by different ones of the numeric characters 1, 2, 3 and 4. The individual flip-flop terminals are similarly identified. Thus, flip-flop 15–1 has terminals D1, C1, R1, Q1 and $\overline{Q}$1.

The counter stages are interconnected as illustrated in FIG. 8 so as to produce the sequence of output conditions shown in table 2 in response to the 8X frequency tone which is commonly applied to the clock terminal of each of the counter stages.

TABLE II

| Q1 | Q2 | Q3 | Q4 |
|---|---|---|---|
| L | L | L | L |
| H | L | L | L |
| H | H | L | L |
| H | H | H | L |
| H | H | H | H |
| L | H | H | H |
| L | L | H | H |
| L | L | L | H |
| L | L | L | L |

It should be noted at this point that when the FSK modulator 10 is not transmitting data, the frequency-output-enable FOE signal is low (L) so as to continuously hold flip-flop 15–1 in a reset condition. During such time as the FOE signal is low, the frequency shift keying circuit 14 continually supplies the 8X end-of-message tone, $8f_{eom}$, (see table 1 and FIG. 7). After the FOE signal resets the counter stage 15–1, the 8X end-of-message tone clocks the reset state of the 15–1 flip-flop through the remainder of the counter stages until all counter stages are in the same state. That is, their respective Q1 outputs are all low and will remain so until the RTS signal again goes high (table 1). This condition of the counter corresponds to the reference crossing (e.g., zero crossing) of the quantized wave as illustrated in FIG. 5.

The quantized waveform 30–3 formed at the summing node of the summing network 16 (FIG. 6) is shaped and filtered by the wave-shaping and filtering network 17 to produce the sinusoid wave shown in FIG. 5. The wave-shaping and filter network 17 preferably presents an effective zero AC (alternating current) impedance to the summing node. Although a finite AC impedance may be employed between the summing node and the ground reference, there will be interaction between each of the individual summing branches such that not only will the calculation of the summing resistor values be more involved but also the performance of the summer will be a function of loading. Accordingly, the wave-shaping network preferably takes the form of the operational amplifier (OP-AMP) configuration shown in FIG. 9.

Figure 9:
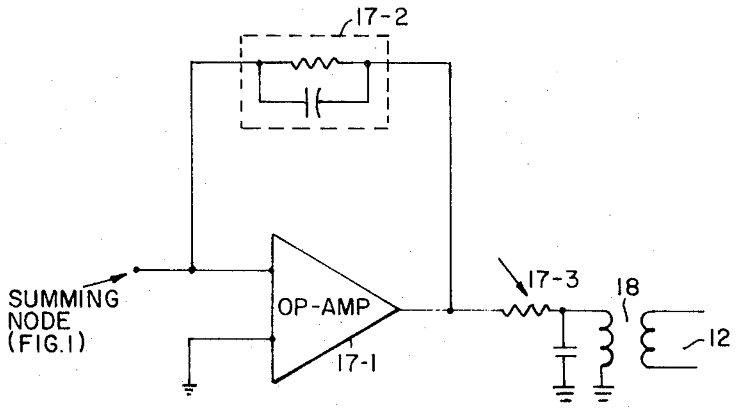
FIG. 9 is a block diagram, in part, and a circuit schematic, in part, of a wave-shaping and filtering network suitable for use in the FSK modulator.

Referring now to FIG. 9, the wave-shaping network 17 includes an OP- AMP 17–1 connected to integrate the resultant staircase waveform. To this end a feedback path including a high pass filter 17–2 is connected between the output of the OP-AMP and one of its input terminals which also receives the waveform 30–3. The other input terminal of the OP-AMP is connected to a suitably reference voltage, illustrated in FIG. 9 as circuit ground. A low pass filter 17–3 is connected between the output of the OP-AMP 17–1 and the primary of the coupling transformer 18.

Since the quantized waveform includes neither the third nor the fifth odd harmonic nor any of the even harmonics, relatively simple filtering circuits (such as the illustrated filters 17–2 and 17–3) may be employed. In addition, the resistors and capacitors employed in the filters may have relatively low component tolerances. This should be contrasted with the prior art systems in which the filters were required to distinguish the second harmonic of the lower frequency bit tone and/or the third harmonic of the end-of-message tone from the higher frequency bit tone. For example, in one typical application the bit tones are 1,200 Hertz and 2,200 Hertz and the end-of-message tone 880 Hertz. The filtering networks were then required to distinguish the 2,200-Hertz tone from the 2,400-Hertz second harmonic of the lower bit tone and from the 2,640-Hertz third harmonic of the end-of-message tone.

What is claimed is:

1. A digital data modulator responsive to a bivalued digital data signal to produce a modulated signal, said modulator comprising:
   modulation-encoding means responsive to said bivalued digital data signal to produce an encoded pulse train, one characteristic of which is varied according to the selected type of modulation;
   a square wave generator responsive to said encoded pulse train to produce $n$ square waves, all of which have the same variable characteristic as said one characteristic of the pulse train, and all of which are phase displaced from one another;
   a summation network for summing said $n$ square waves with weightings to produce an approximate sinusoidal wave, a like characteristic of which varies according to the variations of the characteristics of said square waves and pulse train, the relative square wave displacements and summation network weightings being such as to eliminate a selected set of harmonics of the fundamental frequency of the approximate sinusoidal wave; and
   means for filtering said approximate sinusoidal wave to produce said modulated signal.
2. The invention according to claim 1
   wherein said $n$ square waves have relative phase displacements of $\pi/n$ or multiples thereof from one another; and
   wherein said summing means includes a summing node commonly coupled to plural summing branches each receiving a different one of said square waves.
3. The invention according to claim 2
   wherein said square wave generator includes a digital counter having $n$ stages, with each stage producing one of said $n$ waves.
4. The invention according to claim 3
   wherein said filter means presents an effective zero AC impedance to said summing node; and
   wherein said filtered wave is adapted to be coupled to a communication channel.
5. The invention according to claim 4
   wherein said cancelled harmonics include the even harmonics and every other odd pair of odd harmonics beginning with the third and fifth harmonics.
6. The invention according to claim 5
   wherein said modulation type is frequency modulation such that the variable signal characteristic is frequency.
7. A frequency shift keying modulator comprising
   frequency tone encoding means responsive to a multilevel digital signal to provide a tone-encoded wave,
   square wave producing means responsive to said tone-encoded wave for producing $n$ square waves, all of which are functions of said tone-encoded wave and which are phase displaced from one another;
   summation means for summing said $n$ square waves with weightings to produce an approximate sinusoidal wave of fundamental frequency $f_o$ with certain ones of the harmonics of $f_o$ being cancelled in the summation; and
   means for filtering said sinusoidal wave.
8. The invention according to claim 7
   wherein said multilevel digital signal has first and second levels indicative of first and second binary values, respectively; and
   wherein said cancelled harmonics include the even harmonics and the third and fifth odd harmonics of $f_o$.

9. The invention according to claim 8 wherein said $n$ digital waves are phase displaced from one another by $\pi/n$ radians or multiples thereof.

10. The invention according to claim 9 wherein said summation means includes a summing node commonly coupled to $n$ summing branches having relative summing weights and receiving separate ones of the digital waves; and wherein said wave-producing means includes an $n$-stage digital counter responsive to said tone-encoded wave to provide from each of its stages one of said $n$ square waves.

11. The invention according to claim 10 wherein said filter means presents an effective zero AC impedance to said summing node.

* * * * *